US012792112B2

(12) United States Patent
Carr et al.

(10) Patent No.: US 12,792,112 B2
(45) Date of Patent: Nov. 10, 2026

(54) SYSTEMS AND METHODS FOR WIRELESS INVENTORY MANAGEMENT

(71) Applicant: Terso Solutions, Madison, WI (US)

(72) Inventors: Mabel Carr, Madison, WI (US); Jason Gennaro, Madison, WI (US); Matt Tourdot, Madison, WI (US)

(73) Assignee: Terso Solutions, Inc., Madison, WI (US)

( * ) Notice: Subject to any disclaimer, the term of this patent is extended or adjusted under 35 U.S.C. 154(b) by 30 days.

(21) Appl. No.: 18/905,507

(22) Filed: Oct. 3, 2024

(65) Prior Publication Data

US 2025/0117054 A1 Apr. 10, 2025

Related U.S. Application Data

(60) Provisional application No. 63/542,811, filed on Oct. 6, 2023.

(51) Int. Cl.

| | |
|---|---|
| ***G06F 1/18*** | (2026.01) |
| ***G06Q 10/087*** | (2023.01) |
| ***G08C 17/02*** | (2006.01) |

(52) U.S. Cl.

CPC ........... *G06F 1/189* (2013.01); *G06Q 10/087* (2013.01); *G08C 17/02* (2013.01)

(58) Field of Classification Search

CPC combination set(s) only.

See application file for complete search history.

(56) References Cited

U.S. PATENT DOCUMENTS

| | | | | |
|---|---|---|---|---|
| 7,661,591 | B2 * | 2/2010 | Dearing | G06Q 30/0603 235/382 |
| 7,791,479 | B2 * | 9/2010 | Dearing | G06Q 10/08 340/568.1 |
| 8,025,228 | B2 * | 9/2011 | Dearing | G06Q 30/0603 235/380 |
| RE46,326 | E * | 2/2017 | Dearing | G06Q 10/08 |
| 10,148,918 | B1 * | 12/2018 | Seiger | G06Q 10/0833 |
| 10,262,295 | B2 * | 4/2019 | Sharp, Jr. | G06K 7/10297 |
| RE47,599 | E * | 9/2019 | Dearing | G06Q 20/18 |

(Continued)

OTHER PUBLICATIONS

International Search Report and Written Opinion for International Application No. PCT/US2024/049755, mailed Dec. 6, 2024, 9 Pages.

(Continued)

*Primary Examiner* — Lisa Lea-Edmonds

(74) *Attorney, Agent, or Firm* — Casimir Jones, S.C.; Brian F. Bradley

(57) ABSTRACT

A system comprising a shelving unit including a shelf defining a supporting surface. The shelving unit is electrically coupled to a power source and a network. The system further includes a bin removably positioned on the supporting surface; a module removably coupled to the bin; a first wireless component coupled to the shelf and in electrical communication with the network; and a second wireless component coupled to the bin or the module. Electrical power is wirelessly transferred between the first wireless component and the second wireless component. A data set is wirelessly transferred between the first wireless component and the second wireless component. The module is in electrical communication with the network.

24 Claims, 4 Drawing Sheets

(56) References Cited

U.S. PATENT DOCUMENTS

| | | | | |
|---|---|---|---|---|
| 10,676,279 | B1 * | 6/2020 | Bidram | A01G 9/143 |
| 11,057,590 | B2 * | 7/2021 | Seiger | H04N 23/56 |
| 11,423,276 | B2 * | 8/2022 | Henry | H04W 4/35 |
| 11,727,239 | B2 * | 8/2023 | Henry | G06K 19/0716 235/385 |
| 11,750,008 | B2 * | 9/2023 | Neeld | G06Q 10/087 709/223 |
| 11,847,517 | B2 * | 12/2023 | Henry | G06K 19/0723 |
| 11,961,613 | B2 * | 4/2024 | Bolneni | G06Q 10/087 |
| 12,026,661 | B2 * | 7/2024 | Ramos | G06Q 10/087 |
| 12,223,458 | B2 * | 2/2025 | Bronicki | G05D 1/0094 |
| 12,361,249 | B2 * | 7/2025 | Henry | G07F 9/001 |
| 12,469,005 | B2 * | 11/2025 | Ghosh | G06Q 10/087 |
| 12,469,255 | B2 * | 11/2025 | Ghosh | G06V 10/762 |
| 12,536,769 | B2 * | 1/2026 | Savvides | G06V 10/443 |
| 2002/0070846 | A1 * | 6/2002 | Bastian, II | G06Q 10/087 340/5.92 |
| 2002/0183882 | A1 * | 12/2002 | Dearing | G06Q 10/087 705/28 |
| 2005/0125312 | A1 * | 6/2005 | Dearing | G06K 7/10336 705/28 |
| 2005/0149226 | A1 * | 7/2005 | Stevens | B65G 1/1371 700/214 |
| 2007/0296596 | A1 * | 12/2007 | Moore | G06K 7/10336 340/572.7 |
| 2008/0121700 | A1 * | 5/2008 | Dearing | G06Q 10/087 235/381 |
| 2010/0116885 | A1 * | 5/2010 | Dearing | G07G 1/0045 235/382 |
| 2011/0106296 | A1 * | 5/2011 | Stevens | B65G 1/1371 235/492 |
| 2011/0192901 | A1 * | 8/2011 | Dearing | G06Q 30/06 235/385 |
| 2018/0068258 | A1 * | 3/2018 | Blumenau | G06Q 10/087 |
| 2018/0225625 | A1 * | 8/2018 | DiFatta | G06Q 10/087 |
| 2018/0322376 | A1 * | 11/2018 | Henry | G06Q 10/087 |
| 2019/0044753 | A1 * | 2/2019 | Neeld | G06Q 10/087 |
| 2020/0156868 | A1 * | 5/2020 | Bidram | B65G 1/0492 |
| 2021/0201256 | A1 * | 7/2021 | Rahilly | G07F 17/0092 |
| 2022/0027841 | A1 * | 1/2022 | Mitchell | G06K 19/08 |
| 2023/0260631 | A1 * | 8/2023 | Bolneni | G16H 40/20 705/2 |
| 2024/0281762 | A1 * | 8/2024 | Ramos | G06Q 10/0833 |
| 2024/0338657 | A1 * | 10/2024 | Poker | B65G 1/02 |
| 2025/0117054 | A1 * | 4/2025 | Carr | G06F 1/189 |
| 2025/0384391 | A1 * | 12/2025 | Francis | G06Q 10/087 |
| 2026/0010872 | A1 * | 1/2026 | Zhao | G06Q 10/087 |
| 2026/0044817 | A1 * | 2/2026 | Ghosh | G06Q 10/087 |

OTHER PUBLICATIONS

"LogiTag", Automated Kanban and par Level Solutions, https://logi-tag.com/automated-kanban/, Retrieved on Feb. 5, 2025, 10 pages.

"Pegasus Medical's EZ Swipe Brochure", Kanban Inventory Management, Retrieved Feb. 5, 2025, 8 pages.

* cited by examiner

SYSTEMS AND METHODS FOR WIRELESS INVENTORY MANAGEMENT

CROSS-REFERENCE TO RELATED APPLICATIONS

The present application claims priority to U.S. Provisional Application No. 63/542,811, filed Oct. 6, 2023, which is incorporated herein by reference in its entirety.

TECHNICAL FIELD

The present disclosure relates to systems, devices, assemblies, and methods for inventory stocking solutions.

BACKGROUND

Conventional "smart" bin inventory stocking solutions use either passive tag communication (e.g., radio frequency identification, RFID) or an active tag powered by a battery. Passive tags limit the amount of data sent to the user and do not have an option of sending data bidirectionally. Active tags with a battery are more expensive, and the batteries eventually need to be replaced. Both conventional solutions also communicate to tag readers over-the-air, which can lead to tags not being detected due to range or interference. As such, conventional over-the-air solutions typically include one or more reader devices installed separately from the shelving and bins with tuning to achieve optimal coverage.

SUMMARY

The disclosure provides, in one aspect, a system comprising a shelving unit including a shelf defining a supporting surface. The shelving unit is electrically coupled to a power source and a network. The system further includes a bin removably positioned on the supporting surface; a module removably coupled to the bin; a first wireless component coupled to the shelf and in electrical communication with the network; and a second wireless component coupled to the bin or the module. Electrical power is wirelessly transferred between the first wireless component and the second wireless component. A data set is wirelessly transferred between the first wireless component and the second wireless component. The module is in electrical communication with the network.

In some embodiments, the shelving unit includes a display or user interface.

In some embodiments, the shelving unit includes a shelf processor electrically coupled to the first wireless component, and wherein the shelf processor is in electrical communication with the network.

In some embodiments, the shelf processor controls wireless power transfer between the first wireless component and the second wireless component; and wherein the shelf processor sends the data set to the module or receives the data set from the module through the first wireless component and the second wireless component.

In some embodiments, the shelf defines a plurality of slots, and each of the plurality of slots is configured to receive at least two bins.

In some embodiments, the bin includes a recess in which the module is at least partially received.

In some embodiments, the second wireless component is positioned within a wall of the bin, and wherein the wall abuts the supporting surface of the shelf.

In some embodiments, the module includes a display.

In some embodiments, the display shows an indicator, and wherein the display changes the indicator in response to receiving instructions from the second wireless component.

In some embodiments, the indicator is a product name, a product type, a quantity, a connection status, or any combination thereof.

In some embodiments, the module includes a switch movable in response to a user input.

In some embodiments, the module includes a module processor in electrical communication with the second wireless component.

In some embodiments, the module includes a battery.

In some embodiments, the network includes a database, and the database is updated based on the data set.

In some embodiments, the system further comprises a terminal electrically coupled to the network, and wherein the data set is wirelessly transferred from the first wireless component to the second wireless component in response to a user command received at the terminal.

In some embodiments, the module provides a location signal in response to a user selecting a desired item on the terminal, wherein the desired item is positioned within the bin.

In some embodiments, the module provides a location signal in response to a user selecting a desired item on a user interface on the shelving unit, wherein the desired item is positioned within the bin.

In some embodiments, the first wireless component is a Qi transmitter or a receiver, and wherein the second wireless component is a Qi transmitter or a receiver.

In some embodiments, the module can send the data set to the network, and the module can receive the data set from the network.

The disclosure provides, in one aspect, a system comprising a shelving unit with a first wireless platform coupled to a shelf and a second wireless platform coupled to the shelf. The system further includes a first bin; a second bin; a first module coupled to the first bin; and a second module coupled to the second bin. When the first bin is positioned on the first wireless platform, the first wireless platform wirelessly transmits power to the first module, and the first wireless platform wirelessly transmits data to or wirelessly receives data from the first module. When the first bin is positioned on the second wireless platform, the second wireless platform wirelessly transmits power to the first module, and the second wireless platform wirelessly transmits data to or wirelessly receives data from the first module. When the second bin is positioned on the first wireless platform, the first wireless platform wirelessly transmits power to the second module, and the first wireless platform wirelessly transmits data to or wirelessly receives data from the second module.

In some embodiments, the second module is interchangeable with the first module.

In some embodiments, the system further comprises a user input device configured to receive a user indication of a desired product; wherein the first bin contains the desired product, and the first module produces a location signal in response to the user indication.

In some embodiments, the shelf includes a front surface, a rear surface, and a support surface extending between the front surface and the rear surface; and wherein the first wireless platform and the second wireless platform are positioned along an axis that extends through the front surface and the rear surface.

In some embodiments, the shelving unit is electrically coupled to a power source and a network with an inventory database.

The disclosure provides, in one aspect, a method comprising detecting a bin with a module removably coupled to the bin is positioned on a wireless platform; transferring power wirelessly from the wireless platform to the module; transferring data wirelessly from the wireless platform to the module; transferring data wirelessly from the module to the wireless platform; and updating an inventory database based on the data transferred wirelessly from the module to the wireless platform.

In some embodiments, the method further includes updating the module based on the data transferred wirelessly from the wireless platform to the module.

In some embodiments, updating the module includes updating a display on the module based on the data transferred wirelessly from the wireless platform to the module.

In some embodiments, the method further comprises detecting that the bin is removed from the wireless platform and updating the inventory database in response to detecting that the bin is removed from the wireless platform.

In some embodiments, the module is powered by a battery when the bin is removed from the wireless platform.

In some embodiments, transferring power wirelessly and transferring data wirelessly is performed with a first wireless component in the wireless platform and a second wireless component coupled to the bin or module.

In some embodiments, the bin is a first bin, and the module is a first module, and wherein the method further includes detecting a second bin with a second module removably coupled to the second bin is positioned on the wireless platform.

In some embodiments, the method further comprises transferring power wirelessly from the wireless platform to the second module; transferring data wirelessly from the wireless platform to the second module; transferring data wirelessly from the second module to the wireless platform; and updating an inventory database based on the data transferred wirelessly from the second module to the wireless platform.

In some embodiments, the method further comprises receiving a user input on the module, and wherein transferring data wirelessly from the module to the wireless platform includes the user input.

Other aspects of the disclosure will become apparent by consideration of the detailed description and accompanying drawings.

Definitions

As used herein, the terms "processor", "central processing unit", or "CPU" are used interchangeably and refer to a device that is able to read a program from a computer memory (e.g., ROM or other computer memory) and perform a set of steps according to the program. As used herein, the term "processor" (e.g., a microprocessor, a microcontroller, a processing unit, or other suitable programmable device) can include, among other things, a control unit, an arithmetic logic unit ("ALC"), and a plurality of registers and can be implemented using a known computer architecture (e.g., a modified Harvard architecture, a von Neumann architecture, etc.). In some embodiments, the processor is a microprocessor that can be configured to communicate in a stand-alone and/or a distributed environment and can be configured to communicate via wired or wireless communications with other processors, where such one or more processor can be configured to operate on one or more processor-controlled devices that can be similar or different devices.

As used herein, the term "memory" is any memory storage and is a non-transitory computer readable medium. The memory can include, for example, a program storage area and the data storage area. The program storage area and the data storage area can include combinations of different types of memory, such as a ROM, a RAM (e.g., DRAM, SDRAM, etc.), EEPROM, flash memory, a hard disk, a SD card, or other suitable magnetic, optical, physical, or electronic memory devices. The processor can be connected to the memory and execute software instructions that are capable of being stored in a RAM of the memory (e.g., during execution), a ROM of the memory (e.g., on a generally permanent bases), or another non-transitory computer readable medium such as another memory or a disc. In some embodiments, the memory includes one or more processor-readable and accessible memory elements and/or components that can be internal to the processor-controlled device, external to the processor-controlled device, and can be accessed via a wired or wireless network. Software included in the implementation of the methods disclosed herein can be stored in the memory. The software includes, for example, firmware, one or more applications, program data, filters, rules, one or more program modules, and other executable instructions. For example, the processor can be configured to retrieve from the memory and execute, among other things, instructions related to the processes and methods described herein.

As used herein, the term "computer readable medium" refers to any device or system for storing and providing information (e.g., data and instructions) to a computer processor. Examples of computer readable media include, but are not limited to, DVDs, CDs, hard disk drives, magnetic tape, and servers for streaming media over networks, whether local or distant (e.g., cloud-based).

"About" and "approximately" are used to provide flexibility to a numerical range endpoint by providing a given value that may be "slightly above" or "slightly below" the endpoint without affecting the desired result.

The term "coupled," as used herein, is defined as "connected," although not necessarily directly, and not necessarily mechanically. The term coupled is to be understood to mean physically, magnetically, chemically, fluidly, electrically, or otherwise coupled, connected, or linked and does not exclude the presence of intermediate elements between the coupled elements absent specific contrary language.

As used herein, the term "in electronic communication" refers to electrical devices (e.g., computers, processors, etc.) that are configured to communicate with one another through direct or indirect signaling. Likewise, a computer configured to transmit (e.g., through cables, wires, infrared signals, telephone lines, airwaves, etc.) information to another computer or device, is in electronic communication with the other computer or device.

As used herein, the term "transmitting" refers to the movement of information (e.g., data) from one location to another (e.g., from one device to another) using any suitable means.

As used herein, the term "network" generally refers to any suitable electronic network including, but not limited to, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some embodiments, the network is a cellular network, such as, for example, a Global System for Mobile Communications ("GSM") network, a General Packet Radio Service ("GPRS") network, an Evolution-Data Optimized ("EV-DO") network, an Enhanced Data Rates for GSM Evolution ("EDGE") network, a 3GSM network, a 4GSM network, a 5G New Radio, a Digital Enhanced Cordless Telecommunications ("DECT") network, a digital AMPS ("IS-136/TDMA") network, or an Integrated Digital Enhanced Network ("iDEN") network, etc.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number therebetween with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "top" and "bottom", "front" and "rear", "inner" and "outer", "above", "below", "upper", "lower", "vertical", "horizontal", "upright" and the like are used as words of convenience to provide reference points.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents, and other references mentioned herein are incorporated by reference in their entirety. The materials, methods, and examples disclosed herein are illustrative only and not intended to be limiting.

Figure 1:
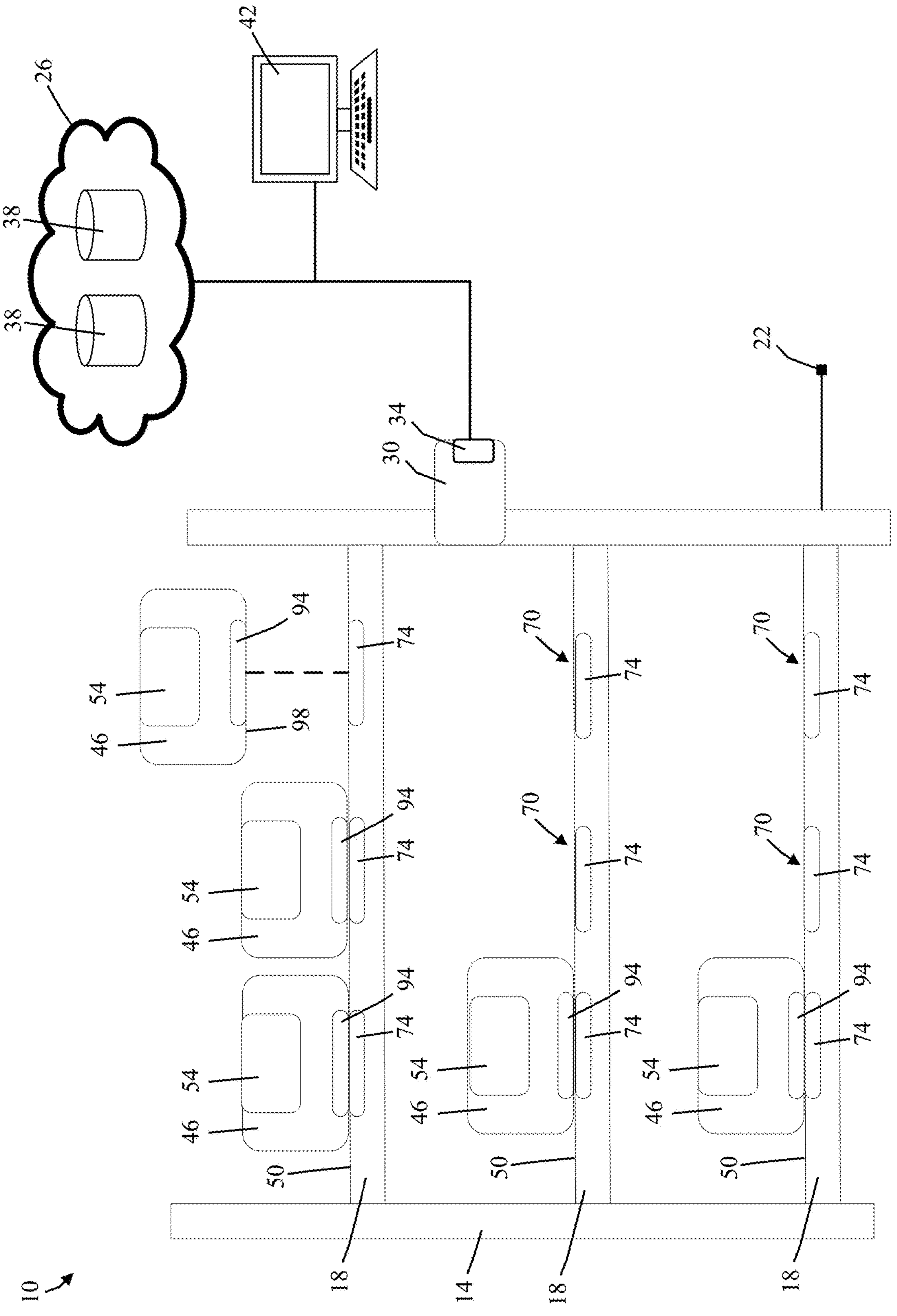
FIG. 1 is a schematic of a system including a shelving unit and a plurality of bins.

With reference to FIG. 1, a system 10 (e.g., an inventory management system) includes a shelving unit 14 with at least one shelf 18. The shelving unit 14 is electrically coupled to a power source 22 and a network 26. In some embodiments, the power source 22 is a 120 Volt AC electrical outlet. In some embodiments, the shelving unit 14 is connected to the network 26 through an ethernet port. In some embodiments, the shelving unit 14 includes a display or user interface 30. In some embodiments, the display 30 shows an internet connection status, a count of devices placed on shelves, or other relevant information. In some embodiments, the display 30 has a user interface to allow setup and maintenance of the system 10. The shelving unit 14 includes a shelf processor 34 in electrical communication with the network 26.

In some embodiments, the network 26 is a cloud-based distributed computing network. In the illustrated embodiment, the network 26 includes at least one database 38. For example, the database 38 may be an inventory database. In some embodiments, the system 10 further includes a terminal 42 electrically coupled to the network 26. In some embodiments, the terminal 42 is separate from the shelving unit 14 such that the terminal 42 may be in a different room or building or city from the shelving unit 14. In some embodiments, the terminal 42 is a mobile phone, a tablet, a computer, or other similar devices capable of accessing the network 26. In some embodiments, the terminal 42 is a user input device configured to receive a user identification of a desired product.

The system 10 further includes at least one bin 46 removably positioned on the shelves 18 of the shelving unit 14. In particular, the shelves 18 define a supporting surface 50 (e.g., an upper surface) and the bins 46 are removably positioned on the supporting surface 50. The bins 46 are configured to receive an inventory of an item.

Figure 3:
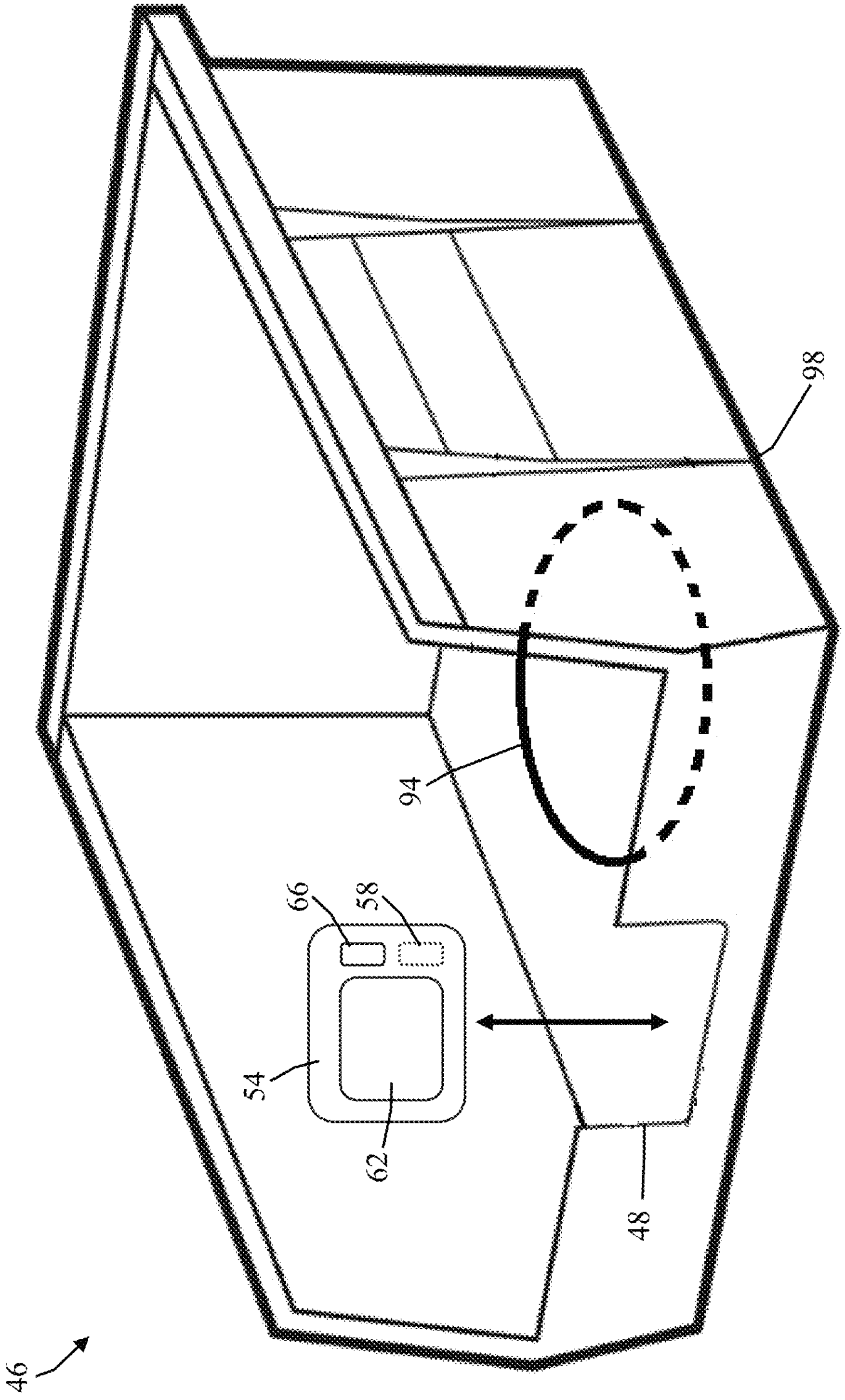
FIG. 3 is a perspective view of one of the plurality of bins of FIG. 1.

The system 10 further includes at least one module 54 that is removably coupled to the bins 46. With reference to FIG. 3, the bin 46 may include a recess 48 in which the module 54 is at least partially received. In some embodiments, any module 54 may be removably coupled to any one of the plurality of bins 46.

As detailed herein, the module 54 is electrically powered by the shelving unit 14. In some embodiments, the module 54 includes a module processor 58. In some embodiments, the module 54 includes a battery. In some embodiments, the battery temporarily powers the module 54 to display information if the bin 46 and module 54 are removed from the shelf 18. In the illustrated embodiment, the module 54 includes a display 62. In some embodiments, the display 62 shows at least one indicator. In some embodiments, the indicator is a product name, a product type, a quantity, a connection status, or any combination thereof. In some embodiments, the module 54 includes a switch 66 movable in response to a user input. For example, the switch 66 is actuated by a user to indicate the bin 46 associated with the module 54 is empty or out of stock. In some embodiments, a user actuates the switch 66 on the module 54, which would cause the module 54 to communicate to the shelving unit 14, as detailed further herein, that the bin 46 is out of stock. The shelving unit 14 would then communicate to the network 26 that restocking is needed. When someone restocks the empty bins, they may actuate the switch 66 on the module 54, which would cause the module 54 to then to communicate to the shelving unit 14 (and subsequently the network 26) that the bin has been restocked.

With continued reference to FIG. 1, the system 10 includes a plurality of wireless platforms 70, each with a first wireless component 74, coupled to the shelves 18. In the illustrated embodiment, the first wireless components 74 are in electrical communication with the power source 22 and with the network 26. In some embodiments, the shelf processor 34 is electrically coupled to each of the first wireless components 74. The shelving unit 14 may include any number of wireless platforms 70 and first wireless components 74 arranged in any pattern on the shelves 18.

Figure 2:
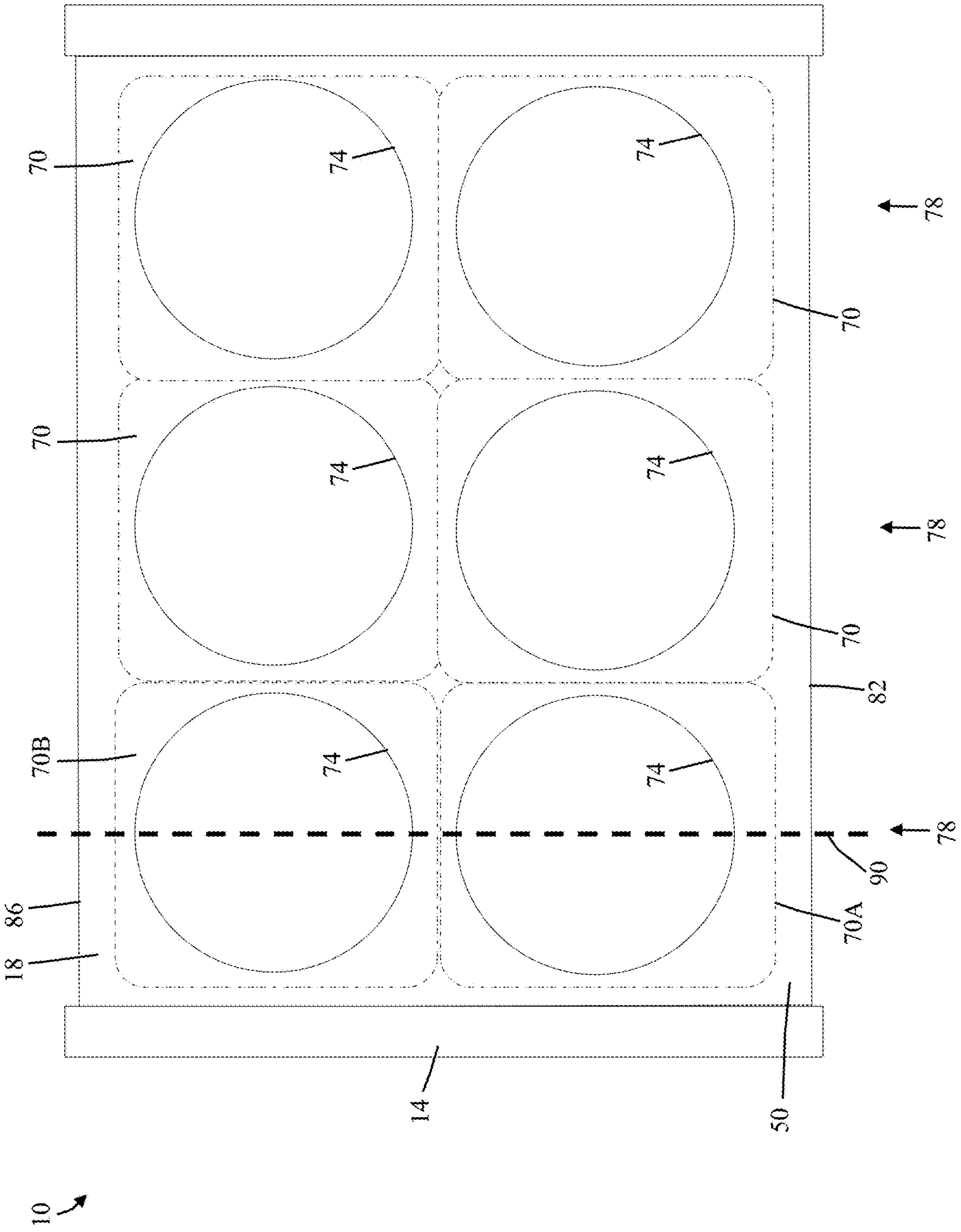
FIG. 2 is a top view of a shelf of the shelving unit of FIG. 1.

With reference to FIG. 2, each shelf 18 defines a plurality of slots 78, and each of the slots 78 is configured to receive at least two bins 46. In the illustrated embodiment, the shelf 18 includes six wireless platforms 70 (each with a first wireless component 74) arranged in a 2×3 grid pattern. In other words, the shelf 18 of FIG. 2 includes three slots 78 that are at two wireless platforms 70 deep. The shelf 18 includes a front surface 82, a rear surface 86, and the support surface 50 extends between the front surface 82 and the rear surface 86. A first wireless platform 70A and a second wireless platform 70B are positioned along an axis 90 that extends through the front surface 82 and the rear surface 86. In the illustrated embodiment, the first wireless platform 70A and the second wireless platform 70B are positioned in a single slot 78. Having each slot 78 on the shelf 18 be at least two wireless platforms 70 deep advantageously allows for implementing a kanban bin system where the front bin is replaced with the rear bin when the front bin is empty.

The system 10 further includes a plurality of second wireless components 94 coupled to the bins 46, the modules 54, or any combination thereof. In the illustrated embodiment, the second wireless components 94 are integrated into a bottom wall 98 of the bins 46 (FIG. 3). In other words, the second wireless component 94 is positioned within the bottom wall 98 of the bin 46. In some embodiments, the bottom wall 98 abuts the supporting surface 50 of the shelf 18 when the bin 46 is positioned on the shelf 18. In the illustrated embodiment, the module processor 58 is in electrical communication with the second wireless component 94 when the module 54 is received within the recess 48 of the bin 46. In other embodiments, the second wireless components are integrated into a bottom portion of the modules 54.

As detailed herein, electrical power and a data set are wirelessly transferred between a first wireless component 74 and a second wireless component 94 positioned in proximity to the first wireless component 74. In other words, both power and data are wirelessly transferred between the shelving unit 14 and the bin 46 or module 54.

Regardless of whether the second wireless component is physically coupled to the bin or the module, the module 54 is in electrical communication with the network 26 through wireless transmission of data between the wireless components 74, 94. In some embodiments, the shelf processor 34 controls wireless power transfer between the first wireless component 74 and the second wireless component 94. In some embodiments, the shelf processor 34 sends a data set to the module 54 or receives a data set from the module 54 through the first wireless component 74 and the second wireless component 94. As such, the shelf processor 34 controls power to the shelves 18 and communicates with the bins 46 and modules 54 placed on the shelves 18. When the shelf processor 34 receives a data set from the module 54, the shelf processor 34 transmits the data set to the network 26. In some embodiments, the database 38 is updated based on the data set transmitted from the module 54. As such, the module 54 can send a data set to the network 26 and the module 54 can receive a data set from the network 26. In other words, the module 54 has bi-directional data communication with the network 26.

When a first bin 46 is positioned on the first wireless platform 70, the first wireless platform 70 wirelessly transmits power to the first module 54 and the first wireless platform 70 wirelessly transmits data to, or wirelessly receives data from, the first module 54. Likewise, when the first bin 46 is positioned on a second wireless platform 70, the second wireless platform 70 wirelessly transmits power to the first module 54, and the second wireless platform 70 wirelessly transmits data to, or wirelessly receives data from, the first module 54. In other words, the first bin 46 may be positioned on any wireless platform 70 and the module 54 associated with the first bin 46 is configured to wirelessly receive power, wirelessly transfer data, and wirelessly receive data. Likewise, when a second bin 46 is positioned on the first wireless platform 70, the first wireless platform 70 wirelessly transmits power to the second module 54, and the first wireless platform 70 wirelessly transmits data to, or wirelessly receives data from, the second module 54. As detailed herein, the second module 54 is interchangeable with the first module 54. In other words, the first module 54 can be removed from the first bin 46 and the second module 54 can be connected to the first bin 46. Advantageously, the interchangeable modules 54 can be efficiently deployed and utilized on various sized and shaped bins.

In some embodiments, the first wireless component 74 is a Qi transmitter or a receiver, and the second wireless component 94 is a Qi transmitter or a receiver. Specifically, the Qi specification from the Wireless Power Consortium. The Qi transmitter or the receiver are configured for negotiation and authentication standards that allow modules 54 and the shelving unit 14 to identify themselves and verify they are allowed to communicate with each other. Additionally, the Qi transmitter or the receiver are configured for using proprietary data packets to send custom data between a module 54 and the shelving unit 14, after negotiation and authentication. In some embodiments, the proprietary data packets include information regarding a stock level, a product, a slot on the shelf, etc.

In one example, a data set is wirelessly transferred from the first wireless component 74 to the second wireless component 94 in response to a user command received at the terminal 42. In some embodiments, the module 54 provides a location signal in response to a user selecting a desired item on the terminal 42, when the desired item is positioned within the bin 46 associated with the module 54. In other words, a user may select a desired item on the terminal 42, and the module 54 associated with the bin 46 containing the desired item will produce a location signal to aid the user in determining the location of the desired item. In some embodiments, the location signal is a light, a sound, a vibration, or other suitable sensory feedback to the user. In some embodiments, the module 54 provides a location signal in response to a user selecting a desired item on the user interface 30 on the shelving unit 14, when the desired item is positioned within the bin 46 associated with the module 54. In other words, the user may select a desired item to be located from either the terminal 42 connected to the network 26 or from the user interface 30 of the shelving unit 14.

In some embodiments, the display 62 on the module 54 changes an indicator in response to receiving instructions from the second wireless component 94. In other words, the module 54 may receive instructions to adjust an indicator on the display 62 from the second wireless component 94. In some embodiments, the second wireless component 94 receives the module instructions from the first wireless component 74, which received the module instructions form the network 26.

The shelving unit 14 communicates to the network 26 and provides functionality including, but not limited to: permits a user to manage what product is tied to which module 54; see current stocking statuses of bins 46; know which shelf 18 and slot 78 each bin 46 is in; "search" for a product by triggering modules 54 linked to that product to blink their displays 62; and get notified on the terminal 42 when bins 46 go out of stock.

Figure 4:
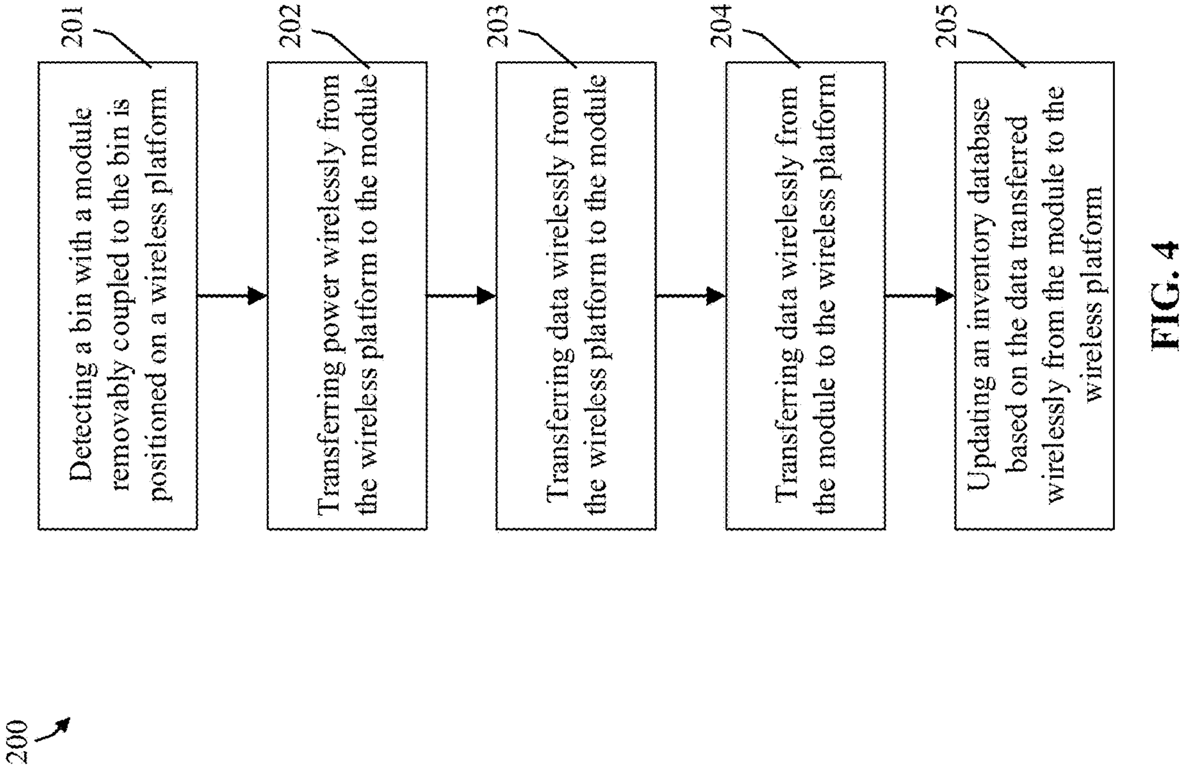
FIG. 4 is a method of detecting a bin and wirelessly transferring power and data.

With reference to FIG. 4, a method 200 includes: (STEP 201) detecting a bin with a module removably coupled to the bin is positioned on a wireless platform. In some embodiments, the method 200 includes a plurality of bins, and further includes detecting that a second bin with a second module removably coupled to the second bin is positioned on the wireless platform. In other words, any one of a plurality of bins may be positioned on a wireless platform.

The method 200 further includes: (STEP 202) transferring power wirelessly from the wireless platform to the module. The method 200 further includes: (STEP 203) transferring data wirelessly from the wireless platform to the module. The method 200 further includes: (STEP 204) transferring data wirelessly from the module to the wireless platform. In other words, the method 200 includes bi-directional data transfer between the bin and the shelving unit.

In some embodiments, the method 200 includes receiving a user input on the module and transferring data wirelessly from the module to the wireless platform includes the user input. As disclosed herein, transferring power wirelessly and transferring data wirelessly is performed with a first wireless component in the wireless platform and a second wireless component coupled to the bin or coupled to the module.

The method 200 further includes: (STEP 205) updating an inventory database based on the data transferred wirelessly from the module to the wireless platform. In some embodiments, the method 200 further includes updating the module based on the data transferred wirelessly from the wireless platform to the module. In some embodiments, updating the module includes updating a display on the module based on the data transferred wirelessly from the wireless platform to the module.

In some embodiments, the method 200 further includes detecting that the bin is removed from the wirelessly platform and updating an inventory database in response to detecting that the bin is removed from the wireless platform. In some embodiments, the module is powered by a battery when the bin is removed from the wireless platform.

In some embodiments, the method 200 further includes: transferring power wirelessly from the wireless platform to the second module; transferring data wirelessly from the wireless platform to the second module; transferring data wirelessly from the second module to the wireless platform; and updating the inventory database based on the data transferred wirelessly from the second module to the wireless platform. The specific sequences in which the steps are presented in the method 202 are illustrative and it is contemplated that the sequences can be varied and still remain within the spirit and scope of various embodiments disclosed herein.

In one embodiment, the systems and methods disclosed herein provide a kanban inventory solution where end users interact with bins by pulling stock from the bin in the front of the slot, and when the front bin is empty, the end user removes the front bin from the shelf, pulls the second bin forward, and puts the empty bin behind the bin that is now in front.

The system disclosed herein provides active two-way communication between the bins and the users of the network cloud system. Advantageously, users have a much more complete picture of the status and location of their inventory. In contrast, conventional systems are more passive and only have information flowing in one direction. The present disclosure provides bins that actively communicate with a smart system and can receive data from the user as well. The present system provides power to the bins themselves, avoiding any issue where dead batteries prevent users from being able to use their system. The bins also communicate directly without having to go over-the-air, preventing any coverage issues, and removing the need for readers to be installed separately from the shelving and bins.

Various features and advantages are set forth in the following claims.

What is claimed is:

1. A system comprising:

a shelving unit including a shelf defining a supporting surface, wherein the shelving unit is electrically coupled to a power source and a network;

a bin removably positioned on the supporting surface;

a module removably coupled to the bin;

a first wireless component coupled to the shelf and in electrical communication with the network; and a second wireless component coupled to the bin or the module;

wherein electrical power is wirelessly transferred between the first wireless component and the second wireless component; and wherein a data set is wirelessly transferred between the first wireless component and the second wireless component; and wherein the module is in electrical communication with the network.

2. The system of claim 1, wherein the shelving unit includes a display or user interface.

3. The system of claim 1, wherein the shelving unit includes a shelf processor electrically coupled to the first wireless component, and wherein the shelf processor is in electrical communication with the network.

4. The system of claim 3, wherein the shelf processor controls wireless power transfer between the first wireless component and the second wireless component; and wherein the shelf processor sends the data set to the module or receives the data set from the module through the first wireless component and the second wireless component.

5. The system of claim 1, wherein the shelf defines a plurality of slots, and each of the plurality of slots is configured to receive at least two bins.

6. The system of claim 1, wherein the bin includes a recess in which the module is at least partially received.

7. The system of claim 1, wherein the second wireless component is positioned within a wall of the bin, and wherein the wall abuts the supporting surface of the shelf.

8. The system of claim 1, wherein the module includes a display.

9. The system of claim 8, wherein the display shows an indicator, and wherein the display changes the indicator in response to receiving instructions from the second wireless component.

10. The system of claim 9, wherein the indicator is a product name, a product type, a quantity, a connection status, or any combination thereof.

11. The system of claim 1, wherein the module includes a switch movable in response to a user input.

12. The system of claim 1, wherein the module includes a module processor in electrical communication with the second wireless component.

13. The system of claim 1, wherein the module includes a battery.

14. The system of claim 1, wherein the network includes a database, and wherein the database is updated based on the data set.

15. The system of claim 1, further comprising a terminal electrically coupled to the network, and wherein the data set is wirelessly transferred from the first wireless component to the second wireless component in response to a user command received at the terminal.

16. The system of claim 15, wherein the module provides a location signal in response to a user selecting a desired item on the terminal, wherein the desired item is positioned within the bin.

17. The system of claim 1, wherein the module provides a location signal in response to a user selecting a desired item on a user interface on the shelving unit, wherein the desired item is positioned within the bin.

18. The system of claim 1, wherein the first wireless component is a Qi transmitter or a receiver, and wherein the second wireless component is a Qi transmitter or a receiver.

19. The system of claim 1, wherein the module can send the data set to the network, and the module can receive the data set from the network.

20. A system comprising:

a shelving unit with a first wireless platform coupled to a shelf and a second wireless platform coupled to the shelf;

a first bin;

a second bin;

a first module coupled to the first bin; and a second module coupled to the second bin;

wherein, when the first bin is positioned on the first wireless platform, the first wireless platform wirelessly transmits power to the first module, and the first wireless platform wirelessly transmits data to or wirelessly receives data from the first module; and when the first bin is positioned on the second wireless platform, the second wireless platform wirelessly transmits power to the first module, and the second wireless platform wirelessly transmits data to or wirelessly receives data from the first module; and when the second bin is positioned on the first wireless platform, the first wireless platform wirelessly transmits power to the second module, and the first wireless platform wirelessly transmits data to or wirelessly receives data from the second module.

21. The system of claim 20, wherein the second module is interchangeable with the first module.

22. The system of claim 20, further comprising a user input device configured to receive a user indication of a desired product; wherein the first bin contains the desired product, and wherein the first module produces a location signal in response to the user indication.

23. The system of claim 20, wherein the shelf includes a front surface, a rear surface, and a support surface extending between the front surface and the rear surface; and wherein the first wireless platform and the second wireless platform are positioned along an axis that extends through the front surface and the rear surface.

24. The system of claim 20, wherein the shelving unit is electrically coupled to a power source and a network with an inventory database.

* * * * *